United States Patent
Vaartstra

(10) Patent No.: US 9,258,536 B2
(45) Date of Patent: Feb. 9, 2016

(54) IMAGING SYSTEMS WITH PLASMONIC COLOR FILTERS

(71) Applicant: Semiconductor Components Industries, LLC, Phoenix, AZ (US)

(72) Inventor: Brian Vaartstra, Nampa, ID (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 107 days.

(21) Appl. No.: 13/874,771

(22) Filed: May 1, 2013

(65) Prior Publication Data

US 2013/0293749 A1 Nov. 7, 2013

Related U.S. Application Data

(60) Provisional application No. 61/642,386, filed on May 3, 2012.

(51) Int. Cl.
*H04N 5/235* (2006.01)
*H04N 9/04* (2006.01)
*G02B 5/00* (2006.01)

(52) U.S. Cl.
CPC .............. *H04N 9/045* (2013.01); *G02B 5/008* (2013.01)

(58) Field of Classification Search
CPC .... H04N 9/045; G02B 5/008; G02F 2203/10; G01N 15/1484
See application file for complete search history.

(56) References Cited

U.S. PATENT DOCUMENTS

| | | | |
|---|---|---|---|
| 7,453,109 B2 * | 11/2008 | Koizumi et al. | 257/291 |
| 7,768,654 B2 * | 8/2010 | Cui et al. | 356/521 |
| 8,680,455 B2 * | 3/2014 | Salsman | 250/208.1 |
| 8,779,483 B2 * | 7/2014 | Salsman et al. | 257/294 |
| 8,816,358 B1 * | 8/2014 | Tsai et al. | 257/79 |
| 8,866,950 B2 * | 10/2014 | Yokogawa | 348/340 |
| 2011/0311394 A1 * | 12/2011 | Worsman et al. | 422/62 |
| 2012/0044339 A1 * | 2/2012 | Stith et al. | 348/79 |
| 2012/0194669 A1 * | 8/2012 | Hutto et al. | 348/135 |
| 2012/0200749 A1 * | 8/2012 | Boettiger et al. | 348/273 |
| 2012/0211644 A1 * | 8/2012 | Zheng et al. | 250/208.2 |
| 2012/0257204 A1 * | 10/2012 | Walters | 356/445 |
| 2013/0119236 A1 * | 5/2013 | Lenchenkov | 250/208.1 |

(Continued)

OTHER PUBLICATIONS

Chen, et al.; "CMOS Photodetectors Integrated With Plasmonic Color Filters"; Feb. 1, 2012, IEEE Photonics Technology Letters; vol. 24 No. 3, pp. 197-199.*

(Continued)

*Primary Examiner* — Gary C Vieaux
(74) *Attorney, Agent, or Firm* — Treyz Law Group, P.C.; Jason Tsai

(57) ABSTRACT

An image sensor integrated circuit may contain image sensor pixels. A channel for receiving a fluid with particles such as fluorescent biological samples may be formed on top of the image sensor. Light-control layers may be interposed between the fluid channel and the top of the image sensor. The light-control layers may include a color filter array, a microlens array over the color filter array, and a plasmonic color filter. The plasmonic color filter may be formed from a patterned metal layer on the color filter array or on the microlens array. The patterned metal layer may include openings that are configured to use plasmonic effects to control the colors of light that pass through the plasmonic color filter. The color filter array and the plasmonic color filter, in combination, may block light from a light source in the system while passing fluorescent light from the sample.

14 Claims, 5 Drawing Sheets

(56) References Cited

U.S. PATENT DOCUMENTS

2013/0258091 A1* 10/2013 Ozcan et al. .................... 348/79
2014/0191113 A1* 7/2014 Atwater et al. ............ 250/208.1

OTHER PUBLICATIONS

Yokogawa, et al.; "Plasmonic Color Filters for CMOS Image Sensor Applications"; Jul. 16, 2012; Nano Letters; 12 (8); pp. 4349-4354.*
Zheng, et al.; "Pixel-integrated Optical Structure Designs for CMOS Image Sensor"; specification for U.S. Appl. No. 61/430,690.*

Sasagawa, "Dual-layer Metal-grid Polarizer for Polarization Image Sensor in 65-nm CMOS Technology", Nara Institute of Science and Technology, Nara, Japan, 2012.
Catrysse, "Integrated color pixels in 0.18-mm complementary metal oxide semiconductor technology", Optical Society of America, vol. 20, No. 12, Dec. 2003.
Chen, "High transmission and low color cross-talk plasmonic color filters using triangular-lattice hole arrays in aluminum films", Optical Society of America, Jun. 15, 2010.
Zheng, "Pixel-integrated Optical Structure Designs for CMOS Image Sensor", Department of Electrical Engineering, California Institute of Technology, Pasadena, California.

* cited by examiner

IMAGING SYSTEMS WITH PLASMONIC COLOR FILTERS

This application claims the benefit of provisional patent application No. 61/642,386, filed May 3, 2012 which is hereby incorporated by reference herein in its entirety.

BACKGROUND

This relates generally to imaging systems and, more particularly, to imaging systems with plasmonic color filters.

Opto-fluidic sensors have been developed that can be used to generate images of samples such as cells and other biological specimens. In conventional systems, the samples are suspended in a fluid. The fluid flows over a set of image sensor pixels each having a photodiode. The image sensor pixels may be associated with an image sensor pixel array. As the fluid flows through the channel, image data from the pixels is acquired and processed to form images of the sample.

A light source is sometimes provided, that illuminates the samples. In some situations the light source is configured to excite fluorescent material in the sample. The image sensor is often used to capture images of the fluorescent light. However, it can be difficult to prevent the excitation light from the light source from contaminating fluorescence image signals without providing thick color filter layers. Color filter layers of this type can increase the distance from the sample to the photodiodes in the sensor, which can undesirably affect the optical performance of the sensor. For example, this type of large distance can allow relatively large pixel-to-pixel cross talk.

It would therefore be desirable to provide imaging systems with improved color filters for microfluidic systems.

DETAILED DESCRIPTION

Figure 1:
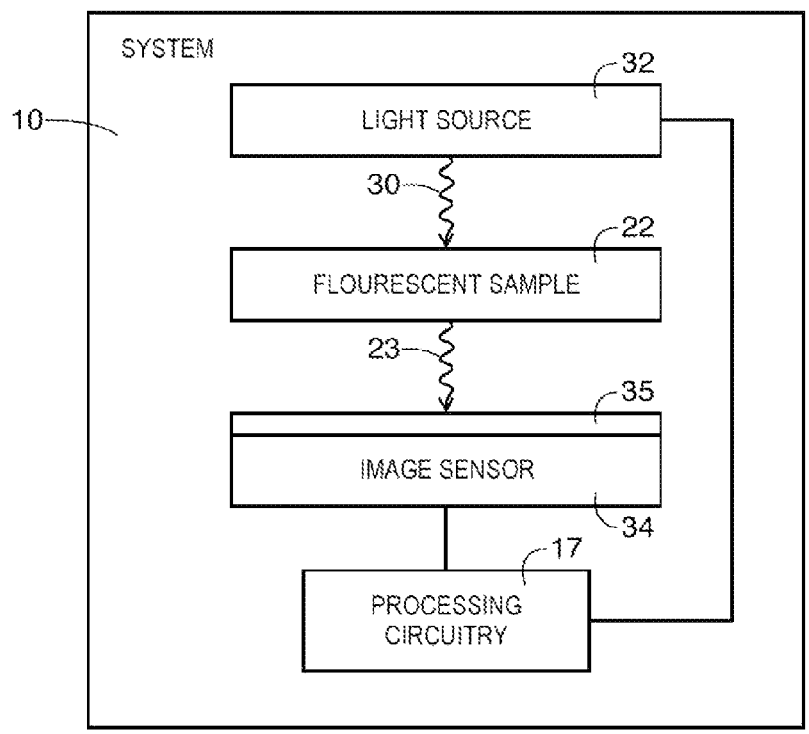
FIG. 1 is a diagram of an illustrative system for imaging and evaluating cells and other biological specimens in accordance with an embodiment of the present invention.

A system of the type that may be used to image and otherwise evaluate cells and other samples such as biological specimens is shown in FIG. 1. As shown in FIG. 1, system 10 may include a light source such as light source 32 and an image sensor such as image sensor 34. Light source 32 may, for example, be a coherent light source that generates light 30. Light 30 may be relatively short wavelength light (e.g., blue light, green light, or ultra-violet light).

Light 30 may be used to illuminate a sample such as sample 22 that has been placed into system 10 for analysis. In some cases, sample 22 may be a fluorescent sample. For example, sample 22 be a biological specimen with fluorescent components (e.g., DNA strands having fluorescent marker molecules attached to ends of the strands). The biological specimen may become attached (e.g., chemisorbed) to a surface of an image sensor such as image sensor 34 via additional intermediate bonding molecules while being illuminated by light 30. In response to light 30, fluorescent components in sample 22 may generate relatively longer wavelength light 23. Light 23 may be red light, infrared light, green light or other fluorescent light.

Image sensor 34 may include a plurality of image sensor pixels that are configured to detect light 23. Image sensor 34 may have associated layers such as light-control layers 35 formed over the image sensor. Light-control layers may be configured to pass light 23 onto image sensor 34 while rejecting light 30. For example, layer 35 may include an array of color filter elements corresponding to each image sensor pixel in image sensor 34 and a plasmonic color filter. In combination, a plasmonic color filter and an array of color filter elements may reject substantially all light 30 while allowing light 23 to reach the light-sensitive portions of image sensor 34. If desired, layers 35 may include other layers such as planarization layers, microlens layers, or other suitable layers.

System 10 may include storage and processing circuitry such as processing circuitry 17. Processing circuitry 17 may be used to control image sensor 34 and/or light source 32. Image data captured using image sensor 34 may be provided to processing circuitry 17. Processing circuitry 17 may perform analysis operations using the captured image data.

Figure 2:
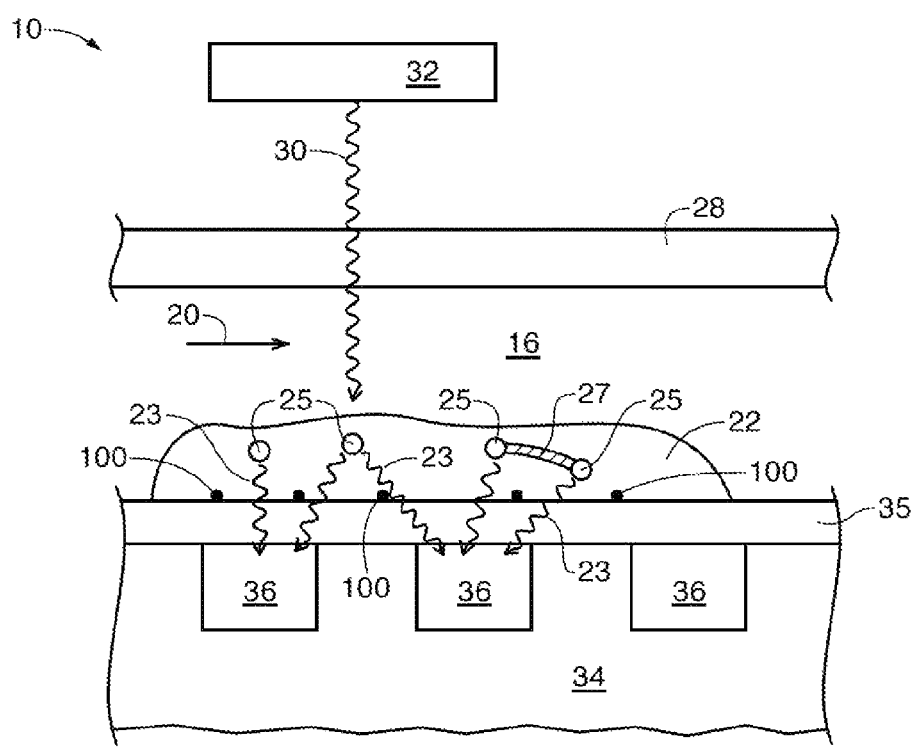
FIG. 2 is a cross-sectional side view of a portion of an image sensor pixel array of the type that may be used in a system of the type shown in FIG. 1 in accordance with an embodiment of the present invention.

If desired, sample 22 may be placed in a channel such as a fluid channel over image sensor 34 for analysis as shown in FIG. 2. In the example of FIG. 2, sample 22 is attached to the surface of image sensor 34 in channel 16. Fluids containing various reactants or reagents may be passed over sample 22 as indicated by arrow 20. Image sensor 34 may be used to capture images of sample 22 while the various reactants and/or reagents contact the sample.

Light 30 from light source 32 may be used to illuminate sample 22. Sample 22 may include fluorescent components 25. Fluorescent components 25 may be fluorescent marker molecules that are configured to generate light 23 in response to being illuminated by light 30. For example, sample 22 may include one or more strands of DNA 27. DNA strands 27 may include fluorescent markers 25 (e.g., one fluorescent marker on each end of the strand) that indicate the location of the strand.

Channel 16 may include structures such as structures 100 (e.g. nano-dots, nano-cavities, chemical deposits, or other structures) that help adhere sample 22 to the top surface of image sensor 34 in channel 16.

Image sensor integrated circuit 34 may be formed from a semiconductor substrate material such as silicon and may contain numerous image sensor pixels 36. Complementary metal-oxide-semiconductor (CMOS) technology or other image sensor integrated circuit technologies may be used in forming image sensor pixels 36 associated circuitry in integrated circuit 34.

Image sensor pixels 36 may form part of an array of image sensor pixels on image sensor integrated circuit 34 (e.g., a rectangular array). Some of the pixels may be actively used for gathering light such as light 23. Other pixels may be inactive or may be omitted from the array during fabrication. In arrays in which fabricated pixels are to remain inactive, the inactive pixels may be covered with metal or other opaque materials, may be depowered, or may otherwise be inactivated. There may be any suitable number of pixels fabricated in integrated circuit 34 (e.g., tens, hundreds, thousands, millions, etc.). The number of active pixels in integrated circuit 34 may be tens, hundreds, thousands, or more).

Image sensor pixels 36 may each include a photosensitive element such as a photodiode and additional pixel circuitry (e.g., transistors, capacitors, etc.) for gathering image signals. As shown in FIG. 2, light-control layers 35 (e.g., an array of color filter elements, an array of microlenses, a plasmonic color filter, etc.) may be formed over image pixels 36 of image sensor integrated circuit 34. Sample 22 may adhere to a top surface of light-control layers 35 during analysis operations.

Image sensor integrated circuit 34 may be covered with a transparent layer of material such as glass layer 28 or other covering layers. Layer 28 may, if desired, be colored or covered with filter coatings (e.g., coatings of one or more different colors to filter light). Light 30 may pass through layer 28 onto sample 22.

Fluid 20 may contain chemical components such as reagents that interact with sample 22. Fluids such as fluid 20 may be passed over the top of sample 22 many times over. Image pixels 36 may be used to capture images of sample 22 after application of each fluid.

Light-source 32 may contain multiple light-emitting diodes of different colors or may contain white-light light-emitting diodes or other white light sources that are provided with different respective colored filters. Light source 32 may be configured to emit laser light of a desired frequency or combination of frequencies.

Light 30 that has passed through glass layer 28 may cause sample 22 to generate fluorescent light 23 to be detected by pixels 36. Light-control layers 35 (e.g., a plasmonic color filter layer in combination with additional color filter elements associated with pixels 36) may prevent light such as light 30 from reaching photosensitive portions of pixels 36 while allowing light 23 from fluorescent sample 22 to reach the photosensitive portions.

Figure 3:
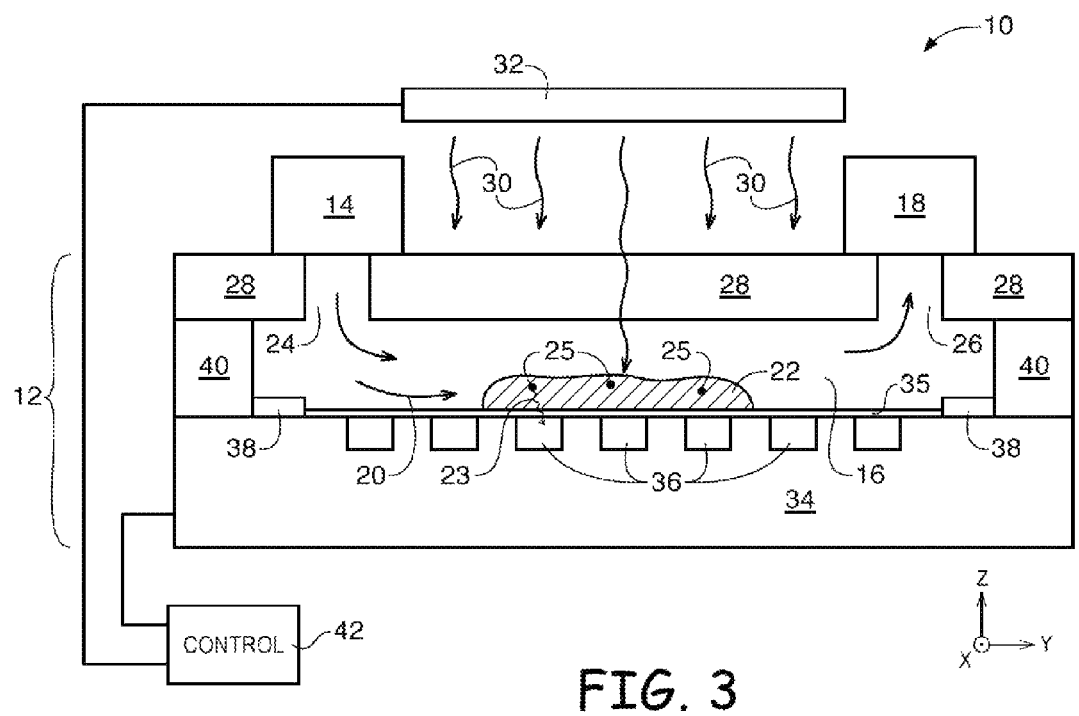
FIG. 3 is a cross-sectional side view of a system of the type shown in FIG. 1 that has been implemented as an opto-fluidic sensor system in accordance with an embodiment of the present invention.

In one suitable configuration that is sometimes discussed herein as an example, system 10 may be implemented as a microfluidic analysis system such as opto-fluidic sensor 12 of FIG. 3.

As shown in FIG. 3, microfluidic sensor 12 may include light-control layers 35 (e.g., an array of color filter elements, an array of microlenses, a plasmonic color filter, etc.) formed over image pixels 36 of image sensor integrated circuit 34.

Structures such as standoffs 40 (e.g., polymer standoffs) may be used to elevate the lower surface of glass layer 28 from the upper surface of image sensor integrated circuit 34 (e.g., from the upper surface of layers 35). This forms one or more channels such as channels 16. Channels 16 may have lateral dimensions (dimensions parallel to dimensions x and z in the example of FIG. 2) of a millimeter or less (as an example). The length of each channel (the dimension of channel 16 along dimension y in the example of FIG. 2) may be 1-10 mm, less than 10 mm, more than 10 mm, may encompass the entire pixel array, or may extend over areas outside of the array. Standoff structures 40 may be patterned to form sidewalk for channels such as channel 16. Light-control layers 35 may be formed on a bottom surface of channel 16.

During operation, fluid flows through channel 16 as illustrated by arrows 20. A fluid source such as source 14 may be used to introduce fluid into channel 16 through entrance port 24. Fluid may, for example, be dispensed from a pipette, from as drop on top of port 24, from a fluid-filled reservoir, from tubing that is coupled to an external pump, etc. Fluid may exit channel 16 through exit port 26 and may, if desired, be collected in reservoir 18. Reservoirs (sometimes referred to as chambers) may also be formed within portions of channel 16.

The rate at which fluid flows through channel 16 may be controlled using fluid now rate control structures. Examples of fluid flow rate control structures that may be used in system 10 include pumps, electrodes, microelectromechanical systems (MEMS) devices, etc. If desired, structures such as these (e.g., MEMs structures or patterns of electrodes) may be used to form fluid flow control gates (i.e., structures that selectively block fluid flow or allow fluid to pass and/or that route fluid flow in particular directions). In the example of FIG. 2, channel 16 has been provided with electrodes such as electrodes 38. By controlling the voltage applied across electrodes such as electrodes 38, the flow rate of fluids in channel 16 such as ionic fluids may be controlled by control circuitry 42.

Fluid 20 may contain samples for analysis such as sample 22. Sample 22 may be a biological sample such as a cell, proteins, DNA, reagents, fluorescent species or other biological or chemical agents or particles. In one mode of operation of system 10, as samples such as sample 22 pass by sensor pixels 36, image data may be acquired. In effect, the cell can be "scanned" across the pattern of sensor pixels 36 in channel 16 in much the same way that a printed image is scanned in a fax machine. Control circuitry 42 (which may be implemented as external circuitry or as circuitry that is embedded within image sensor integrated circuit 34) may be used to process the image data that is acquired using sensor pixels 36. Because the size of each image sensor pixel 36 is typically small (e.g., on the order of 0.5-5.6 microns or less in width), precise image data may be acquired. This allows high-resolution images of cells such as cell 22 to be produced. A typical cell may have dimensions on the order of 1-10 microns (as an example). Images of other samples (e.g., other biological specimens) may also be acquired in this way. Arrangements in which cells are imaged are sometimes described herein as an example.

In another mode of operation for device 10, channel 16 may be configured so that some or all of sample 22 will chemisorb or physisorb to the surface of channel 16 directly above the pixel array. Light source 32 can be used to illuminate sample 22 for static image capture operations or light source 32 can generate light of a specific wavelength that causes fluorescent molecules in the sample to emit light or other energy (e.g. infrared radiation) of a known wavelength. The emitted energy can be detected using pixels 36. Light-control layers 35 may prevent light 30 from light source 32 from reaching pixels 36.

For example, sample 22 may contain DNA strands that are chemisorbed to the sensor surface via additional intermediate bonding molecules and that have fluorescent marker molecules attached to the opposite end of the strands. Captured images of sample 22 may be processed and output data such as the intensity and location of the fluorescent molecules may be generated based on the captured images and output by system 10.

During imaging operations, control circuit 42 (e.g., on-chip and/or off-chip control circuitry) may be used to control the operation of light source 32. Light source 32 may be based on one or more lamps, light-emitting diodes, lasers, or other sources of light. Light source 32 may be a white light source or may contain one or more light-generating elements that emit different colors of light. For example, light-source 32 may contain multiple light-emitting diodes of different colors or may contain white-light light-emitting diodes or other white light sources that are provided with different respective colored filters. Light source 32 may be configured to emit laser light of a desired frequency or combination of frequencies. In response to control signals from control circuitry 42, light source 32 may produce light 30 of a desired color and intensity. Light 30 may pass through glass layer 28 to illuminate the sample in channel 16.

Figure 4:
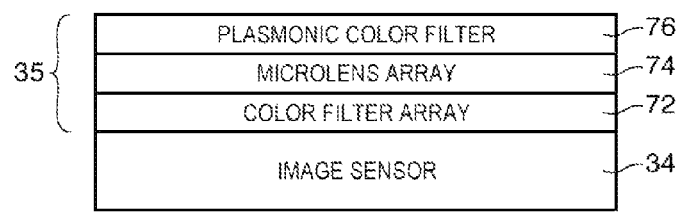
FIG. 4 is a cross-sectional diagram showing how an imager may be provided with a color filter array and a plasmonic color filter in accordance with an embodiment of the present invention.

A cross-sectional side view of an illustrative image sensor integrated circuit having a color filter array and a plasmonic color filter layer is shown in FIG. 4. As shown in FIG. 4, light-control layers 35 may include an array of color filter elements such as color filter array 72, an array of microlenses such as microlens array 74, and a plasmonic color filter layer such as plasmonic color filter 76. Color filter array 72 may include a color filter element associated with each image pixel in image sensor 34. Microlens array 74 may include a microlens associated with each image pixel in image sensor 34 and associated with each color filter element in color filter array 72. Plasmonic color filter 76 may include patterned conductive structures that control the passage of light through the plasmonic color filter using plasmonic effects.

Plasmonic effects are quantum surface field effects in which an evanescent wave of electron density oscillations is generated on or near a surface of a metal or meta-material in response to incoming, incident light. In structures designed to exhibit plasmonic effects, incoming photons incident on the plasmonic structure generate plasmons associated with high intensity electromagnetic fields within nano-scale distances from the surface of the structure. These high intensity electromagnetic fields couple to the incoming photons and affect the path of travel of the photon near the plasmonic surface. These plasmonic effects may affect light of different frequencies differently. Plasmonic structures may therefore be useful in redirecting light of chosen frequencies. This type of plasmonic effect at the surfaces of plasmonic color filter 76 may help prevent light having a particular color (e.g., light 30 of FIGS. 1 and 2) from reaching photosensitive elements of pixels 36.

Figure 5:
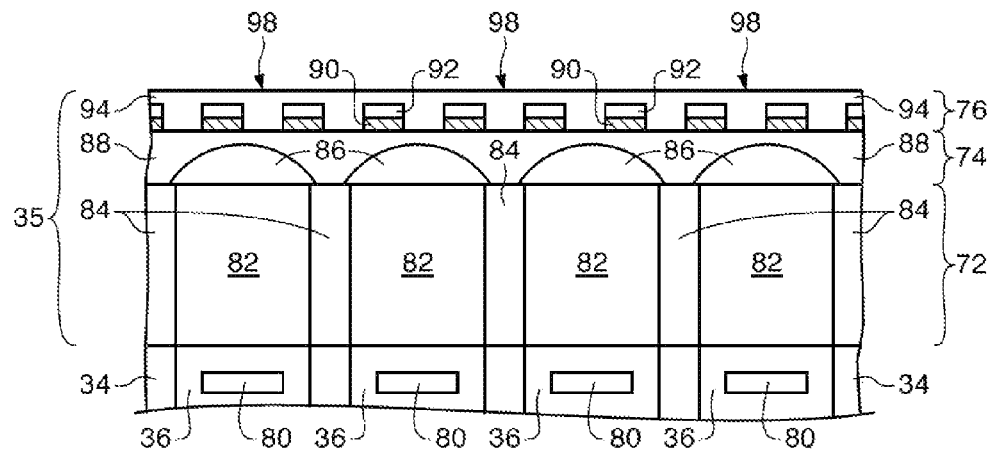
FIG. 5 is a cross-sectional side view of a portion of an imager having a plasmonic color filter layer and a color filter layer in accordance with an embodiment of the present invention.

FIG. 5 is a cross-sectional side view of image sensor 34 and light-control layers 35. As shown in FIG. 5, image pixels 36 may include photosensitive elements 80 (e.g., photodiodes). Image sensor 34 may be a front-side illuminated (FSI) image sensor or a backside illuminated (BSI) image sensors. In a BSI image sensor, fluorescent samples in channel 16 may be located closer to photosensitive elements 80, thereby more efficiently providing light to elements 80.

Color filter array 72 may include a color filter element 82 formed over photodiode 80 of each pixel 36. Color filter elements 82 may be formed from dye-based or pigment-based color filter material. In one suitable arrangement which is sometimes discussed herein as an example, color filter elements 82 are formed from dye-based color filter material. Color filter elements 82 may be red color filter elements, blue color filter elements, green color filter elements, narrow-band color filter elements, infrared color filter elements or other color filter elements. If desired, color filter array 72 may include container material 84 formed between color filter elements 82. Container material 84 may be formed from a material having a refractive index that is different from the refractive index of color filter material 82 so that container material 84 acts as light pipe that guides light through color filter elements 82 onto photodiodes 80. However, this is merely illustrative. If desired, color filter array may be formed without container material 84 between color filter elements 82.

If desired, a microlens array such as microlens array 74 may be formed over color filter array 72. Microlenses 86 may be formed on color filter elements 82 so that light that has passed through plasmonic color filter 76 is focused through color filter elements 82 onto associated photodiodes 80. Microlens array 74 may include a layer of planarizing material such as planarization layer 88 formed over microlenses 86. Planarization layer 88 may form a planar surface on which plasmonic color filter 76 is formed. However, this is merely illustrative. If desired, plasmonic color filter 76 may be formed on color filter array 72 without any intervening microlenses or planarization layers.

As shown in FIG. 5, plasmonic color filter 76 may be formed from a patterned metal layer 90. Metal layer 90 may be a patterned metal layer (e.g., a patterned tungsten layer or a patterned aluminum layer) having metal portions that cover portions of image pixels 36 and openings 98 having a size, a depth, and a spacing that are configured allow light of a given color to pass through layer 76. Patterned metal layer 90 may be configured to pass light of a single color (e.g. red light, blue light, green light, infrared light, x-ray wavelength light, ultraviolet light, etc.) while rejecting light of another color, may be configured to pass a combination of individual colors, or may be configured to pass light having a wide continuous range of colors of light.

Patterned metal layer 90 may have openings 98 configured to pass the same color of light at all locations or may have openings of various configurations in various locations so that layer 90 passes different colors of light at different locations (e.g., some pixels may be configured to receive blue light, some pixels may be configured to receive green light, some pixels may be configured to receive red light, some pixels may be configured to receive infrared light, etc. through plasmonic color filter 76).

Openings 98 that are located over a particular color filter element may be configured to pass light of substantially the same color of light that is passed by that color filter element. However, this is merely illustrative. If desired, openings 98 that are located over a particular color filter element may be configured to pass light of a narrower band of wavelengths than the band of wavelengths of light that are passed by that color filter element, light of a shifted band of wavelengths relative to the wavelengths of light passed by that color filter element, or light of as partially overlapping band of wavelengths relative to the wavelengths of light passed by that color filter element (as examples).

If desired, metal portions of layer 90 may be covered by material 92. Cover layer 92 may be formed from oxide material, metal oxide material, dielectric material, or other suitable material. If desired, plasmonic color filter 76 may be formed from multiple stacked layers of patterned metal and interposed material such as material 92. In a configuration in which multiple layers of patterned metal and interposed dielectric layers are used, plasmonic color filter 76 may use the plasmonic Fabry-Perot effect to control the colors of light that pass through layer 76.

Plasmonic color filter 76 may include an additional layer such as passivation layer 94 formed over patterned metal layer 90 (and over cover material 92). Passivation layer 94 may be formed from a transparent material such as an oxide material, a metal oxide material, a dielectric material, or any other suitable material. Passivation layer 94 may be used to planarize the top of layers 35 in order to form a planar bottom surface for fluid channel 16. However, this is merely illustrative. If desired layer 76 may be provided without passivation layer 94 or passivation layer 94 may conformally cover patterned metal layer 90 and material 92, thereby forming a structured surface that helps control the flow of fluid within the channel and or helps hold a sample in place over pixels 36 during image capture operations. In this type of configuration, the conformal layer of material 92 may be at least partially located within the fluid channel.

Figure 6:
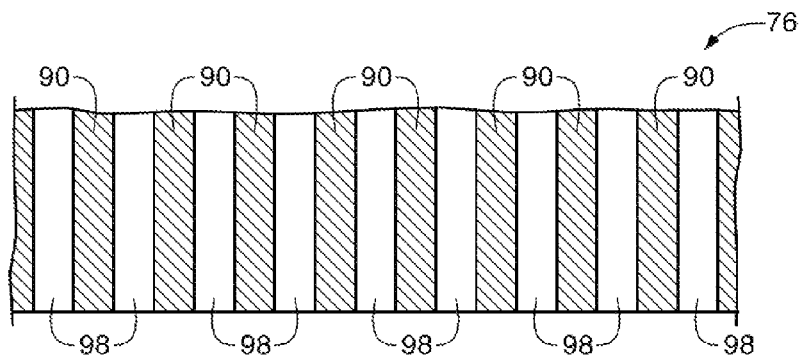
FIG. 6 is a top view of a portion of a plasmonic color filter showing how the plasmonic color filter may be formed from a metal grating structure in accordance with an embodiment of the present invention.

FIG. 6 is a top view of plasmonic color filter 76 showing how openings 98 in patterned metal layer 90 may be elongated linear openings that form a grating pattern over color filter array 72. Openings 98 of the type shown in FIG. 6 may have a width, a depth, and a spacing that determines which frequencies of light are able to pass through openings 98 and onto image sensor 34. However, the grating pattern of FIG. 6 is merely illustrative. If desired, other configurations for openings 98 may be used.

Figure 7:
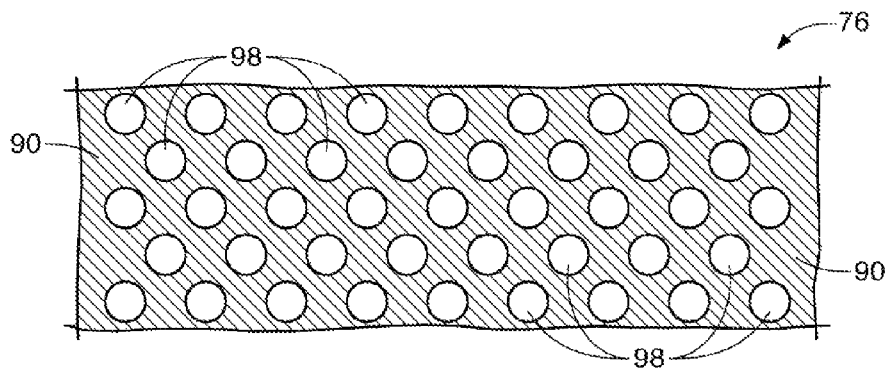
FIG. 7 is a top view of a portion of a plasmonic color filter showing how the plasmonic color filter may be formed from an array of openings in a conductive layer in accordance with an embodiment of the present invention.

FIG. 7 is a top view of plasmonic color filter 76 showing how openings 98 may be an array of circular openings in patterned metal layer 90. Circular openings 98 of layer 90 of FIG. 7 may each have a size, a depth, and a spacing from other openings 98 that determines which frequencies of light are able to pass through openings 98 and onto image sensor 34.

Figure 8:
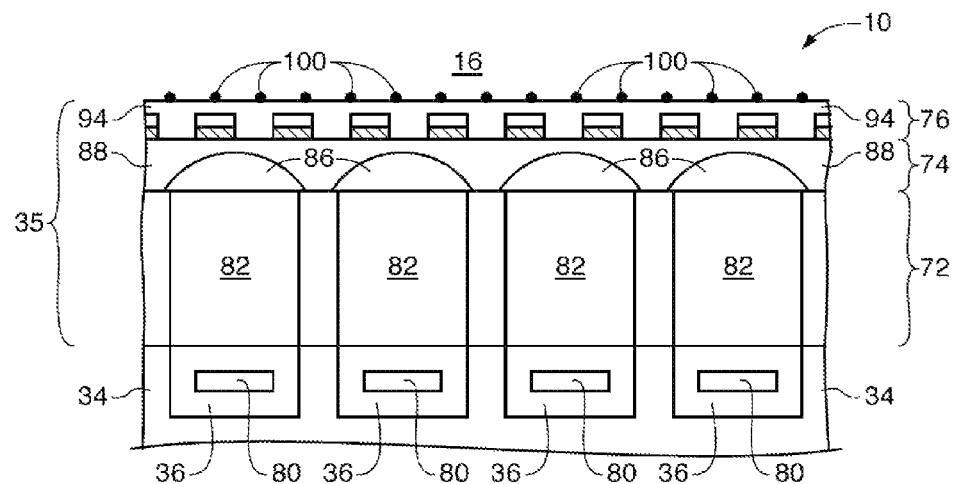
FIG. 8 is a cross-sectional side view of a portion of an imager for a microfluidic system having a plasmonic color filter layer, an array of color filter elements, and nano-dots for anchoring samples in a fluid channel in accordance with an embodiment of the present invention.

If desired, channel 16 may be provided with additional patterned layers that help control the flow of fluid in channel 16 or that help anchor an analyte in place during image capture operations. In the example of FIG. 8, system 10 includes structures 100 (e.g., nano-dots or nano-cavities) on the top surface of passivation layer 94. Structures 100 may be metal nano-dots formed in a suitable pattern on passivation layer 94 for anchoring a sample over image pixels 36 while image pixels 36 are used to capture images of the anchored sample.

Figure 9:
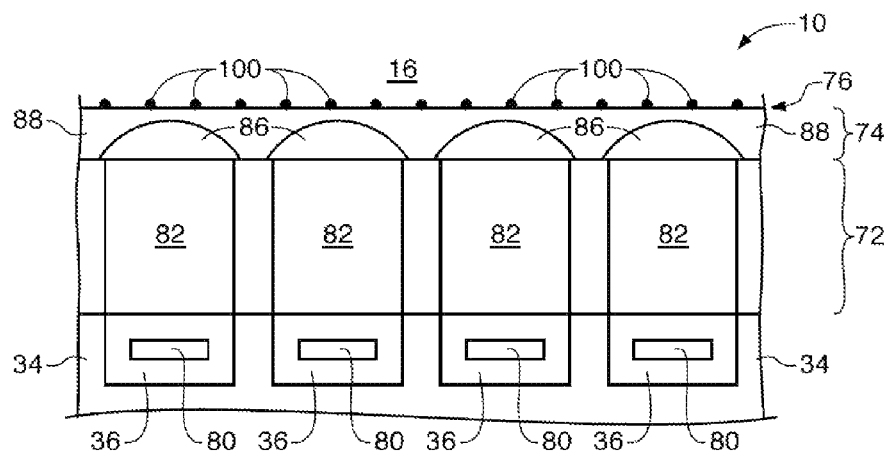
FIG. 9 is a cross-sectional side view of a portion of an imager for microfluidic system having a standard color filter layer, and a plasmonic color filter layer formed from an array of nano-dots that anchor samples a fluid channel in accordance with an embodiment of the present invention.

If desired, structures 100 may be used to form plasmonic color filter 76 as shown in FIG. 9. In the example of FIG. 9, structures 100 are formed on planarization layer 88. In this type of configuration the pattern of microscopic structures 100 that is formed on layer 88 may be arranged so that plasmonic effects at the surfaces of structures 100 influence the path of travel of light in the vicinity of structures 100 so that structures 100 allow a particular color of light to pass through layer 76 and onto pixels 36 (through microlenses 86 and color filter elements 82) while rejecting light of other colors. Nano-dots of the type shown in FIG. 9 that form a plasmonic color filter may also help anchor a sample to be analyzed at a location in channel 16 during image capture operations.

Figure 10:
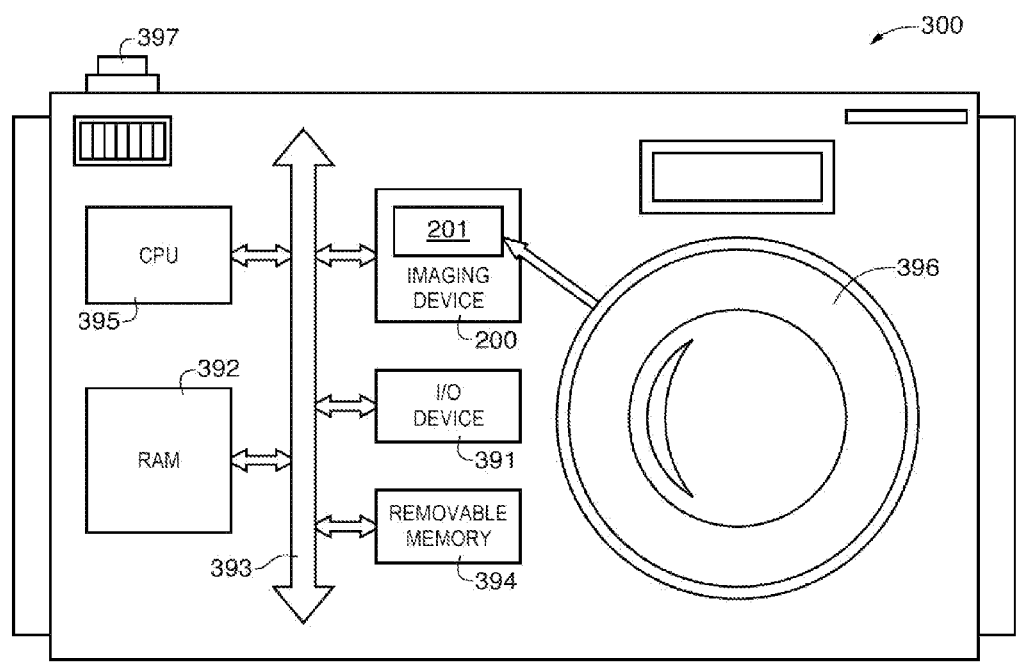
FIG. 10 is a block diagram of a processor system that may include an image sensor with a plasmonic color filter for fluorescent sample imaging in accordance with an embodiment of the present invention.

FIG. 10 shows in simplified form a typical processor system 300, such as a digital camera, which includes an imaging device such as imaging device 200 (e.g., an imaging device 200 such as imaging system 10 of FIG. 1 employing a plasmonic color filter as described above in connection with FIGS. 1-9). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPI 395 over bus 393. Imaging device 200 may be combined with CRT 395, with or without memory storage, on a single integrated circuit or on a different chip. Although bus 393 is illustrated as a single bus, it may be one or more buses or bridges or other communication paths used to interconnect the system components.

Various embodiments have been described illustrating systems for imaging and evaluating samples of fluids containing fluorescent components and other materials. An integrated circuit such as an image sensor array integrated circuit may be provided with fluid channels. Sets of image sensor pixels from an image sensor pixel array on the integrated circuit may form imagers in the fluid channels. A set of light-control layers may be formed on the image sensor integrated circuit. The light-control layers may include a color filter layer, a microlens layer, and a plasmonic color filter layer. The color filter layer may include a color filter element over each image sensor pixel. The microlens layer may include microlens over each image sensor pixel. The plasmonic color filter layer may be formed from a patterned metal layer on the color filter layer or on the microlens layer.

The patterned metal layer may include openings such as linear elongated openings that form a grating pattern or an array of circular, square, rectangular or other shaped openings. The openings may have a size, a shape, a depth, and a relative spacing that are configured to use plasmonic effects to control the colors (frequencies, wavelengths) of light that pass through the plasmonic color filter.

A light source may be provided that emits excitation light that illuminates a fluorescent sample, thereby exciting fluorescent material such as fluorescent molecules of the fluorescent sample. The color filter array and the plasmonic color filter, in combination, may prevent light from the light source from reaching image sensor pixels in the image sensor integrated circuit while allowing fluorescent light from the sample to pass onto the image sensor pixels.

A patterned set of microscopic structures such as nano-dots or nano-cavities may be formed on a top surface of the light control layers. In some situations, the patterned set of nano-dots or nano-cavities may form the plasmonic color filter.

The foregoing is merely illustrative of the principles of this invention which can be practiced in other embodiments.

What is claimed is:

1. An apparatus, comprising:
   an image sensor integrated circuit containing image sensor pixels;
   a color filter array formed over the image sensor pixels;
   a plasmonic color filter formed over the color filter array that comprises a patterned metal layer;
   an array of microlenses interposed between the color filter array and the plasmonic color filter;
   a passivation layer formed over the patterned metal layer; and
   at least one array selected from the group consisting of: an array of metal nano-dots that are located on the passivation layer and an array of nano-cavities that are located in the passivation layer.

2. The apparatus defined in claim 1, further comprising:
   a planarization layer on the array of microlenses, wherein the patterned metal layer is formed on the planarization layer.

3. The apparatus defined in claim 2 wherein the plasmonic color filter layer comprises a cover layer on the patterned metal layer.

4. The apparatus defined in claim 3 wherein the patterned metal layer comprises a plurality of openings and wherein the plurality of openings are configured to prevent light having a color from passing through the openings using plasmonic effects.

5. The apparatus defined in claim 4 wherein the plurality of openings comprises a plurality of linear extended openings that form a grating pattern.

6. The apparatus defined in claim 4 wherein the plurality of openings comprises a plurality of circular openings.

7. The apparatus defined in claim 1, wherein the color filter array comprises a plurality of color filter elements and a container material that is configured to act as a light pipe that is interposed between each color filter element in the plurality of color filter elements.

8. An opto-fluidic system, comprising:
   an image sensor integrated circuit containing image sensor pixels that form at least one imager;
   a fluid channel above the image sensor integrated circuit that is configured to receive fluid containing a fluorescent sample, wherein the at least one imager is located below the fluid channel and is configured to acquire image data using fluorescent light from the fluorescent sample;
   a color filter layer interposed between the image sensor integrated circuit and the fluid channel; and
   a plasmonic color filter interposed between the color filter layer and the fluid channel comprising:
      a patterned metal layer;
      a passivation layer formed over the patterned metal layer; and
      at least one array selected from the group consisting of: an array of metal nano-dots that are located on the passivation layer and an array of nano-cavities that are located in the passivation layer.

9. The opto-fluidic system defined in claim 8 wherein a surface of the passivation layer is adjacent to the fluid channel.

10. The opto-fluidic system defined in claim 9, further comprising:
    a layer of microlenses interposed between the plasmonic color filter and the color filter layer.

11. The opto-fluidic system defined in claim 10 wherein the color filter layer comprises a plurality of color filter elements, each corresponding to a selected one of the image sensor pixels.

12. The opto-fluidic system defined in claim 8, further comprising:
    a light source configured to emit excitation light that excites fluorescent molecules of the fluorescent sample.

13. The opto-fluidic system defined in claim 12 wherein, in combination, the color filter layer and the plasmonic color filter are configured to block the excitation light and to pass the fluorescent light.

14. A system, comprising:
    a central processing unit;
    memory;
    input-output circuitry; and
    an imaging device, wherein the imaging device comprises:
       an image sensor integrated circuit containing image sensor pixels,
       a color filter array formed over the image sensor pixels;
       a plasmonic color filter formed over the color filter array;
       an array of microlenses interposed between the color filter array and the plasmonic color filter; and
       a planarization layer on the array of microlenses, wherein the plasmonic color filter comprises at least one array selected from the group consisting of: an array of patterned nano-dots that are located on the planarization layer and an array of patterned nano-cavities that are located in the planarization layer.

* * * * *